June 22, 1937.    O. C. TRAVER    2,084,876
CONTROL AND PROTECTION OF ELECTRIC CIRCUITS
Filed Dec. 17, 1935
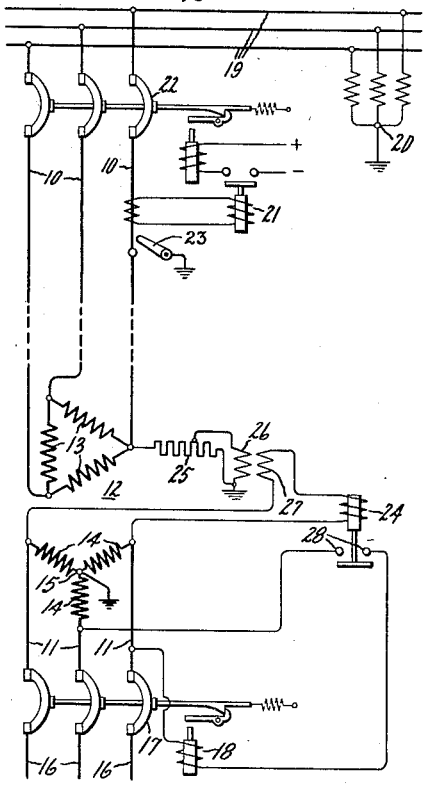
Fig. 1.
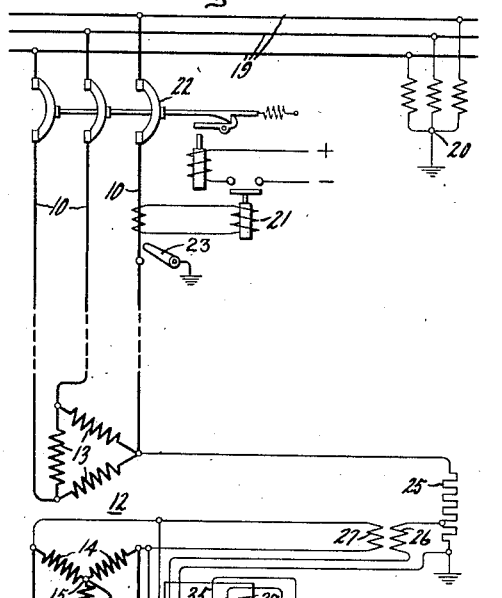
Fig. 2.
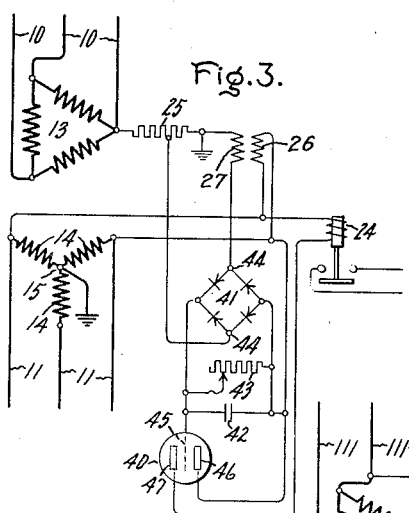
Fig. 3.
Fig. 4.
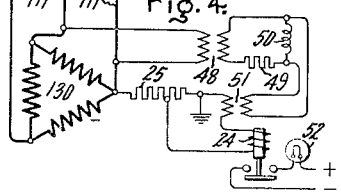
Inventor:
Oliver C. Traver,
by Harry E. Dunham
His Attorney.

Patented June 22, 1937

2,084,876

UNITED STATES PATENT OFFICE 2,084,876

CONTROL AND PROTECTION OF ELECTRIC CIRCUITS

Oliver C. Traver, Drexel Hill, Pa., assignor to General Electric Company, a corporation of New York Application December 17, 1935, Serial No. 54,840

15 Claims. (Cl. 175—294)

My invention relates to improvements in the control and protection of electric circuits and more particularly to improvements in the control and protection of alternating current network distribution systems, and an object of my invention is to provide for an alternating current electric system having phase conductors which may be isolated from ground, an improved arrangement for responding to a ground on one of the isolated phase conductors whereby to determine the presence of a ground and whereby the operator at the supply station of an A. C. network distribution system can selectively disconnect the network at any desired point without interfering with the usual protective features and whereby to maintain sensitive response to ground faults.

In network distribution systems, for example, one or more feeders are connected to the network through step-down transformers and network protectors. Energy directional responsive devices associated with the protectors operate to disconnect the network in the feeder when energy flow is from the network to the feeder. In order selectively to isolate the feeders for inspection and maintenance, and also to save losses, the energy directional responsive devices may be sensitive enough to disconnect the network from the feeder on the reverse flow of energy due to the magnetizing current of the transformer in a feeder which is disconnected at the power station. Such sensitivity often results in unnecessary interruptions due to feed-back from regenerating elevator motors or to circulating currents arising from slight differences in the feeder voltages. In order to avoid such undesired operations, the energy directional means may be desensitized or restrained in some manner, usually in dependence on the network voltage. This, however, sacrifices not only the feature of tripping on reverse magnetizing current but also the much-desired selective feeder isolation control by the operator at the power station.

The selective feeder isolation control and sensitive protection features are very desirable, but means for obtaining them should not increase the hazard of the system or reduce its economies of operation. Also, as high-voltage direct-current tests may be applied to the feeders and connected equipment, any means provided to get the desired control and sensitivity should be able to withstand such tests without damage or change in characteristic and also, in the case of systems having a large number of transformers connected to one feeder, not overload the testing means employed. Furthermore, it must be possible to disconnect the network from any feeder by a simple operation performed at the station without interfering with the normal protection of the network.

An object of my invention is to provide an improved control and protective arrangement whereby the selective operation control and sensitive ground fault protection is insured without interfering with the nonsensitive protective features under normal operating conditions. Another object of my invention is to provide such an improved arrangement as will not be affected by and will not interfere with the high-voltage direct-current tests which are applied to network systems of the type in question. These and other objects of my invention will appear more in detail hereinafter.

My invention will be better understood when considered in connection with the accompanying drawing, and its scope will be pointed out in the appended claims.

In the accompanying sheet of drawings, Fig. 1 illustrates diagrammatically an embodiment of my invention as applied to an alternating-current distribution system, Fig. 2 illustrates diagrammatically another embodiment of my invention, and Figs. 3 and 4 illustrate diagrammatically other embodiments of my invention.

In Fig. 1, I have shown, for the purpose of illustrating my invention, an embodiment thereof as applied to the control and protection of an electric system comprising two electric circuits 10 and 11. As illustrated, these are three-phase circuits which are inductively coupled by a transformer 12 having windings 13 delta-connected to the circuit 10, and windings 14 star-connected to the circuit 11 with the neutral point 15 grounded. The circuit 10 may represent one of a plurality of feeder circuits which are arranged to supply the network indicated schematically by the conductors 16. The network is connected to the respective feeders through suitable circuit interrupting means, such as a latched-in circuit breaker 17 having a trip coil 18. The feeders 10 extend from one or more power stations 19, which are usually provided with a grounded neutral 20. Each feeder is provided with a fault responsive protective means, such for example as overcurrent relays 21, only one being shown for simplicity, and suitable circuit interrupting means 22 for opening the feeder at the power station on the occurrence of abnormal conditions on the feeder, for example a ground on the feeder. At the power station, the feeder may be provided with means, such as the switch 23, for grounding one or more of the feeder conductors after the station feeder circuit breaker is opened, as disclosed, for example, in British Patent No. 396,853.

In accordance with my invention, I provide means which is connected to be energized in dependence on a predetermined function of two system voltages and which is operative in response to a ground on the system. In general, one of the voltages is dependent on the voltage to ground of a phase conductor of the system, and another of the voltages is so taken that it is not affected by the grounding of one phase of the system. For example, in alternating-current network distribution systems, the voltages may be respectively derived from the feeder circuit and the network circuit, and the means which responds to the function of these voltages may be operative in response to a ground on the feeder circuit, either to indicate the ground or to effect the disconnection of the network from the feeder. As shown in Fig. 1, this means is a differential arrangement which includes a relay 24. The function of the voltages to which this relay responds is the difference between the voltages, that is the relay is connected to be energized in accordance with the difference between the voltage to ground of one of the feeder circuit conductors 10 and the voltage between two of the network circuit conductors 11. For this purpose and in order to provide means which will not drain off excessive amounts of D. C. test current, I may connect the right-hand feeder circuit conductor 10 to ground through a high resistance 25, across a suitable part of which I connect the primary 26 of a potential transformer whose secondary 27 is connected in series with the winding of a relay 24 and both across two of the network circuit conductors 11. The connections are such that the relay 24 is energized in accordance with the difference between the voltage across the two conductors and the voltage to ground of the particular feeder circuit conductor. The relay 24 has contacts 28 which may be arranged to control the circuit of the trip coil 18 as shown. The connection of the transformer primary winding 26 to the ground resistance 25 and the turn ratio of the primary and secondary windings 26 and 27 are such that the voltage difference is normally substantially zero and the relay 24 remains deenergized.

On the occurrence of a ground on the feeder the circuit breaker 22 is tripped by the feeder fault responsive means 21, thereby disconnecting the grounded neutral 20 from the system. If the ground is on the right-hand feeder circuit conductor 10, the voltage to ground of this conductor after the circuit breaker 22 is open becomes substantially zero, but the voltage across the network circuit conductor to which the transformer secondary winding 27 is connected is not materially decreased. Consequently, the relay 24 is energized to trip the circuit breaker 17. Whether the ground is accidental or purposely applied for selective disconnection by moving the switch 23 to the grounding position after the circuit breaker 22 is open, is immaterial. In the event that a ground occurs on either one of the other two feeder circuit conductors 10, then the voltage on the right-hand feeder conductor increases from star voltage to delta voltage. Regardless of which of the other two feeder circuit conductors 10 becomes grounded, the vectorial differences between the voltages as applied to the relay 24 are sufficient to pick up the relay. Thus, assuming a 1 to 1 ratio for the transformer windings 26 and 27, the voltage applied to the relay 24 when a ground occurs on any one of the feeder circuit conductors 10 would be in magnitude proportional to the voltage between the network circuit conductors across which the secondary winding 27 is connected. The phase relation will of course depend on which feeder circuit conductor is grounded. Since the operation of the relay 24, as shown in Fig. 1, is not dependent on the phase relation of the current supplied to it, this is immaterial.

In the embodiment of my invention illustrated in Fig. 2, the network distribution system is shown as provided with energy directional responsive means, such as a polyphase energy directional relay 28 which is connected and arranged for operation as disclosed in United States Letters Patent 1,883,839, issued October 1, 1932. This relay is responsive to the exchange of energy between the network and the feeder to effect the opening of the circuit breaker 17 when energy flow is from the network to the feeder. The relay 28 comprises voltage windings 29 which are connected to be energized from the network side of the circuit breaker 17 and cooperating current windings 30 which are connected to be energized from the current transformers 31. Also, as disclosed in said patent, the relay 28 may be provided with a restraining or desensitizing means, which is simply illustrated as two voltage windings 32. These are connected to be energized by a potential transformer 33 and to exert a restraining torque tending to prevent movement of the relay to the tripping position.

In the embodiment of my invention shown in Fig. 2, instead of using a purely magnitude difference responsive relay 24 as shown in Fig. 1, I have illustrated a directional relay 34 having two cooperating windings which function to produce a torque dependent on the product of the electric quantities which energize the respective windings 35 and 36 and their phase angle. As shown, the winding 35 is connected to be energized in accordance with the difference between the voltage to ground of one of the feeder circuit conductors 10 and the voltage between two of the network circuit conductors 11, after the manner shown for the winding of relay 24 in Fig. 1, while the winding 36 is connected for energization in accordance with the voltage between the same two network circuit conductors. The operation of the relay 34 is therefore dependent on the product of and the phase relation between the voltage between two of the network circuit conductors and the difference between this voltage and the voltage to ground of one of the feeder circuit conductors. Although the internal phase angle of the relay 34 may be so designed that the relay operates only on a ground on the right-hand feeder circuit conductor 10, it may be arranged to operate in case of a ground on either of the other feeder circuit conductors 10 or a similar relay may be provided for each phase conductor.

The relay 34 may operate either directly to trip the circuit breaker 17, as does the relay 24 of Fig. 1, or, as shown, it may through its contacts 37 control the circuit of an auxiliary relay 38 whose contacts 39 normally complete the circuit of the restraining windings 32 of the energy directional relay 28. Thus, when the relay 34 closes its contacts 37, the relay 38 is energized to open its contacts 39 and thereby remove the restraint on the directional relay 28, whereby to render this relay more sensitive so that in the event of a ground on the feeder 10, whether applied intentionally by the switch 23 for the purpose of isolating the feeder or whether accidental, the circuit breaker 17 will be tripped, if the feeder is disconnected from its neutral 20 by the opening of the circuit breaker 22.

In the embodiment of my invention shown in Fig. 3, I have omitted all but the essential elements of the system in illustrating the grounding responsive means, since this embodiment of my invention is fundamentally the same as that shown in Fig. 1. In order to provide more sensitive operation, I have added a voltage breakdown or glow discharge valve 40 which acts in effect as an amplifier for the relay 24. In this arrangement, it is possible to use a lesser amount of current through the resistor 25 to ground. In order to enable one glow discharge valve to work equally well for a ground on any one of the conductors 10, I provide a full-wave rectifier 41 which may be built up of any suitable rectifying units. I also may provide a smoothing condenser 42 and an adjustable loading resistor 43, for controlling the overall sensitivity of the equipment.

Instead of connecting the primary winding 26 of the potential transformer across the resistor 25, it is connected across two of the phase conductors 11. The secondary winding 27 is connected in series with the voltage of the resistor 25 at the grounded end thereof in such a way as to apply the difference between the voltage across two of the network conductors 11 and the voltage to ground of one of the feeder conductors 10 as derived from the resistance 25 across the terminals 44 of the rectifier 41. Inasmuch as this voltage difference is normally zero, there is normally no voltage between the grid 45 and the anode 46 of the valve 40. There does exist, however, between the anodes 46 and 47 a voltage equal to the voltage between two of the conductors 11. Whenever the voltage difference applied to the terminals 44 of the rectifier 41 becomes sufficiently great, as in case of a ground on one of the feeder conductors 10, then the discharge of the valve 40 is effected to energize the relay 24, which may be arranged to control an alarm or indicating device or to trip the network circuit breaker, as shown in Figs. 1 and 2.

Fig. 4 illustrates an embodiment of my invention as applied to a three-phase circuit whose conductors 111 are ungrounded but may be connected to the delta-connected windings 130 of a machine or transformer. In this embodiment of my invention, I compare the voltage taken from the resistance 25 with a voltage which is substantially unaffected by a ground on any one of the circuit conductors 111 and which may be derived from two of these conductors by suitable means, such as a potential transformer 48. In order to have these voltages normally in phase, I may include in circuit with the windings of the potential transformer 48 suitable phase displacing means, such as a series resistance 49 and a shunt inductance 50. The phase shifted voltage so derived may then be applied to the relay 24 through a transformer 51 in opposition to an equal voltage derived from the lower or grounded end of the resistance 25 so that the relay 24 is normally deenergized. On the occurrence of a ground on one of the phase conductors 111, this voltage balance is upset and the relay 24 energized to control any desired device, for example, to indicate the occurrence of a ground by effecting the energization of a lamp 52.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, a feeder circuit, a network circuit, a transformer having windings connected to said circuits, circuit interrupting means in said network circuit, and means connected to be energized in accordance with a predetermined function of the voltage to ground of only one of the feeder circuit conductors and the voltage between two of the network circuit conductors operative in response to a ground on any phase conductor of the feeder circuit to effect the opening of said circuit interrupting means.

2. In combination, a feeder circuit, a network circuit, a transformer having windings connected to said circuits, circuit interrupting means in said network circuit, means normally responsive only to a predetermined relatively large value of electric energy flow from the network circuit to the feeder circuit for effecting the opening of said circuit interrupting means, and means connected to be energized in accordance with a predetermined function of the voltage to ground of only one of the feeder conductors and the voltage between two of the network circuit conductors operative in response to a ground on any phase conductor of the feeder circuit to effect the opening of said circuit interrupting means in response to a relatively small value of electric energy flow from said network circuit to said feeder circuit.

3. In combination, a feeder circuit, a network circuit, a transformer having windings connected to said circuits, circuit interrupting means in said network circuit, and means connected to be energized in accordance with the difference between the voltage to ground of one of the feeder conductors and the voltage between two of the network circuit conductors operative in response to a ground on the feeder circuit to effect the opening of said circuit interrupting means.

4. In combination, a feeder circuit, a network circuit, a transformer having windings connected to said circuits, circuit interrupting means in said network circuit, and means connected to be energized in accordance with a predetermined function of the voltage between two of the network circuit conductors and the difference between said voltage and the voltage to ground of one of the feeder circuit conductors operative in response to a ground on the feeder circuit to effect the opening of said circuit interrupting means.

5. In combination, a feeder circuit, a network circuit, a transformer having windings connected to said circuits, circuit interrupting means in said network circuit, and means connected to be energized in accordance with the product of the voltage between two of the network circuit conductors and the difference between this voltage and the voltage to ground of one of the feeder circuit conductors for controlling said circuit interrupting means.

6. In combination, a feeder circuit, a network circuit, a transformer having windings connected to said circuits, and means for disconnecting said feeder circuit on the occurrence of a ground on any phase conductor thereof including means connected to be energized in accordance with a predetermined function of the voltage to ground of only one of the feeder circuit conductors and the voltage between two of the network circuit conductors.

7. In combination, a feeder circuit, a network circuit, a transformer having windings connected to said circuits, circuit interrupting means in said network circuit, and means for effecting the opening of said circuit interrupting means on the occurrence of a ground on the feeder circuit including normally balanced differential means connected to be energized in accordance with the difference between the voltage to ground of one of the feeder circuit conductors and the voltage between two of the network circuit conductors.

8. In combination, a feeder circuit, a network circuit, a transformer having windings connected in delta to said feeder circuit and windings connected in star to said network circuit, circuit interrupting means in said network circuit, and means for effecting the opening of said circuit interrupting means on the occurrence of a ground on any one of the feeder circuit conductors including a relay connected to be energized in accordance with the voltage to ground of only one feeder circuit conductor and the voltage across two of said star-connected windings.

9. In combination, two circuits, a transformer having windings connected to said circuits, and means for disconnecting said circuits on the occurrence of a ground on any one of the phase conductors of one of the circuits including means connected to be energized in accordance with a predetermined function of the voltage to ground of only one of the conductors of one of said circuits and a voltage of the other circuit which is appreciably unaffected by a ground on said one circuit.

10. In combination with an alternating current system, means for deriving from said system a voltage dependent on the voltage to ground of one of the conductors of the system, means for deriving from said system a voltage which is substantially unaffected by a ground on one of the conductors of the system, means operative on the occurrence of a ground on one of the system conductors connected to be energized in accordance with a predetermined function of said voltages, and means controlled by said voltage energized means.

11. In combination with an alternating current system, means for deriving from said system a voltage which is substantially unaffected by a ground on one of the system conductors, means for deriving from said system a voltage dependent on the voltage to ground of one of said conductors and normally substantially equal to said first derived voltage, means connected to be energized in accordance with the difference between said derived voltages, and means controlled by said voltage difference energized means.

12. In combination with an alternating current system, means operative on the occurrence of a ground on one of the system conductors including means connected to be energized in accordance with the vectorial difference between a voltage dependent on the voltage to ground of one of the system conductors and another voltage derived from the system and substantially unaffected by a ground on one of the system conductors, and means connected to be operated by said voltage energized means when the vectorial difference between said voltages departs from a predetermined value.

13. In combination with an alternating current network system having a grounded neutral, means operative on the occurrence of a ground on the system for disconnecting said neutral from the system, and means connected to be energized in accordance with a predetermined function of the voltage to ground of a phase conductor and a voltage of the system substantially unaffected by the ground on the system operative after the operation of said disconnecting means.

14. In combination with an alternating current network system having a grounded neutral, means operative on the occurrence of a ground on a portion of the system for disconnecting said neutral from the system, means for deriving from said portion of the system a voltage which is substantially unaffected by the ground on the system, means for deriving from said portion of the system a voltage dependent on the voltage to ground on one of the system conductors and normally substantially equal to said first derived voltage, and means connected to be energized in accordance with the difference between said derived voltages.

15. In combination, two circuits, a transformer having windings connected to said circuits and means for disconnecting one of said circuits from the other circuit including means connected to be energized in accordance with the difference between a voltage dependent on the voltage to ground of a circuit conductor connected to one side of the transformer and another voltage derived from the other side of the transformer normally substantially equal to said first voltage.

OLIVER C. TRAVER.